(12) United States Patent
Kim et al.

(10) Patent No.: US 10,456,678 B2
(45) Date of Patent: Oct. 29, 2019

(54) METHOD AND SYSTEM FOR PROVIDING AN ONLINE CARD GAME BETWEEN USER TERMINALS

(71) Applicants: NHN Entertainment Corporation, Seongnam-si (KR); NHN Studio629 Corporation, Seongnam-si (KR)

(72) Inventors: Dongin Kim, Seongnam-si (KR); Hyoungsun Park, Seongnam-si (KR); SeongHoon Kim, Seongnam-si (KR); Geonho Son, Seongnam-si (KR); Hyunmi Lee, Seongnam-si (KR); Chuljae Lim, Seongnam-si (KR); Pyoung Sun Park, Seongnam-si (KR); Hajin Oh, Seongnam-si (KR); Bo Jeong Ko, Seongnam-si (KR)

(73) Assignees: NHN Corporation, Seongnam-si (KR); NHN Studio629 Corporation, Seongnam-si (KR)

( * ) Notice: Subject to any disclaimer, the term of this patent is extended or adjusted under 35 U.S.C. 154(b) by 0 days.

(21) Appl. No.: 15/857,573

(22) Filed: Dec. 28, 2017

(65) Prior Publication Data
US 2018/0178122 A1    Jun. 28, 2018

(30) Foreign Application Priority Data
Dec. 28, 2016  (KR) .......................... 10-2016-0180768

(51) Int. Cl.
*A63F 13/46* (2014.01)
*A63F 13/332* (2014.01)
(Continued)

(52) U.S. Cl.
CPC ............ *A63F 13/46* (2014.09); *A63F 13/332* (2014.09); *A63F 13/822* (2014.09); *A63F 13/87* (2014.09);
(Continued)

(58) Field of Classification Search
CPC ....................................................... G07F 17/34
See application file for complete search history.

(56) References Cited

U.S. PATENT DOCUMENTS 6,322,445 B1 * 11/2001 Miller .................... G07F 17/32
273/293
6,874,784 B1 * 4/2005 Promutico .......... A63F 3/00157
273/274
(Continued)

FOREIGN PATENT DOCUMENTS

KR    10-2013-0107899    10/2013

*Primary Examiner* — Robert T Clarke, Jr.
(74) *Attorney, Agent, or Firm* — H.C. Park & Associates, PLC

(57) ABSTRACT

A method of providing a card game implemented by a computer includes the steps of; determining open cards and hidden cards different from one another to be assigned to first and second user terminals each including a screen configured to display an open card area having rows and columns and a hidden card area; providing a first card identifier information of the open cards, a first location information of the open cards, a second card identifier information of the hidden cards, and a second location information of the hidden cards; determining a rating of cards disposed along each column of the open card area based on a combination of the cards in the same column; comparing the rating of each column of the first user terminal to that of the second user terminal; and determining win or lose of the card game based on the compared result for each column.

17 Claims, 12 Drawing Sheets

(51) Int. Cl.
*A63F 13/822* (2014.01)
*A63F 13/87* (2014.01)

(52) U.S. Cl.
CPC ..... *A63F 2300/61* (2013.01); *A63F 2300/807* (2013.01)

(56) References Cited

U.S. PATENT DOCUMENTS

| | | | |
|---|---|---|---|
| 8,177,617 B1* | 5/2012 | Nottke | G07F 17/3293 273/292 |
| 2002/0142828 A1* | 10/2002 | Moody | A63F 3/00157 463/20 |
| 2002/0187822 A1* | 12/2002 | Falciglia, Sr. | A63F 1/00 463/13 |
| 2005/0059451 A1* | 3/2005 | Shackleford | G07F 17/32 463/13 |
| 2006/0194628 A1* | 8/2006 | Novellie | A63F 1/00 463/13 |
| 2012/0104696 A1* | 5/2012 | Sanderbeck | A63F 1/00 273/292 |
| 2013/0069310 A1* | 3/2013 | Kaizer | A63F 1/00 273/292 |
| 2013/0310154 A1* | 11/2013 | Sparago | G07F 17/3286 463/25 |
| 2016/0171812 A1* | 6/2016 | Dinkla | G07F 17/322 463/13 |
| 2017/0337780 A1* | 11/2017 | Brockman | A63F 3/00173 |

\* cited by examiner

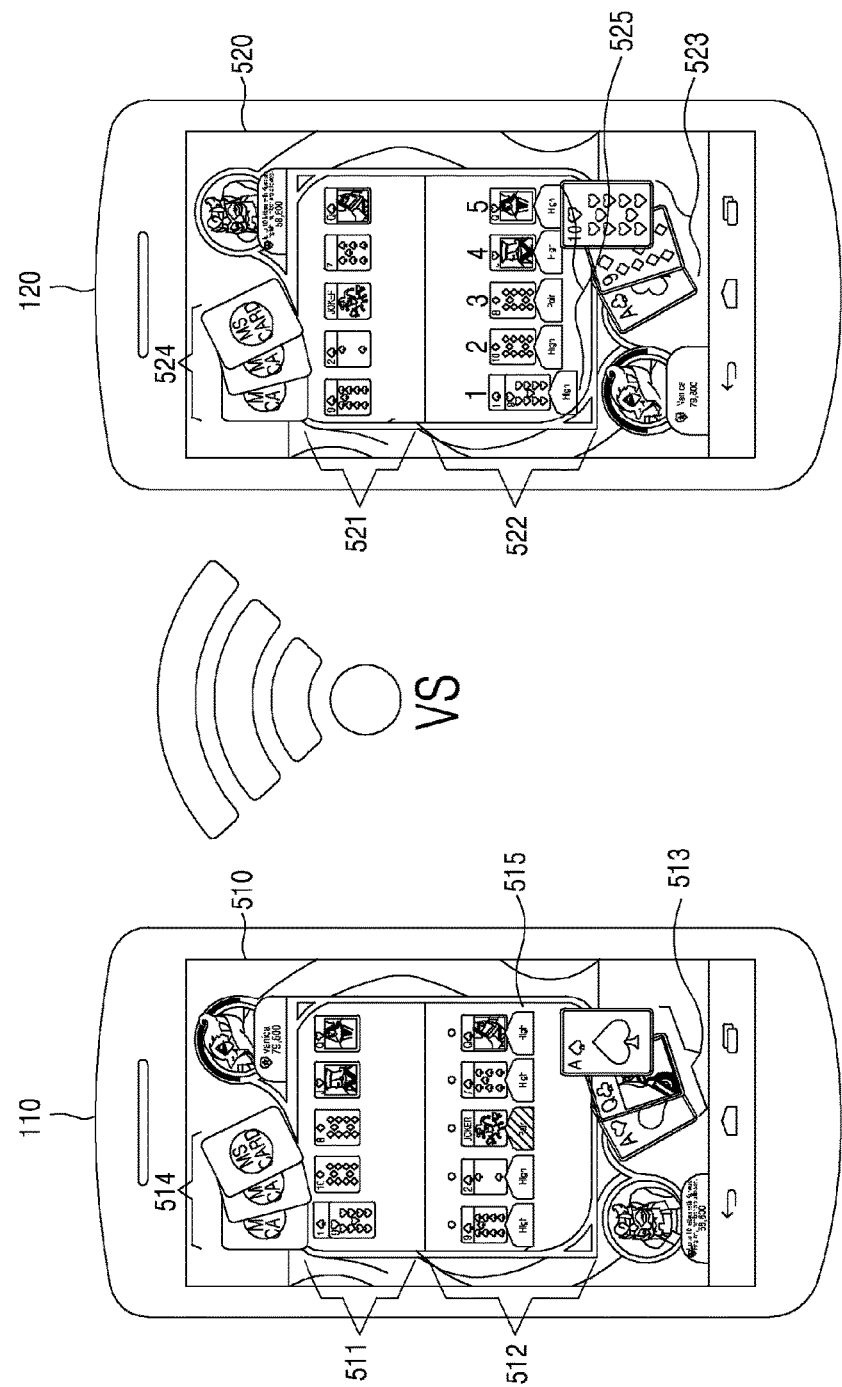

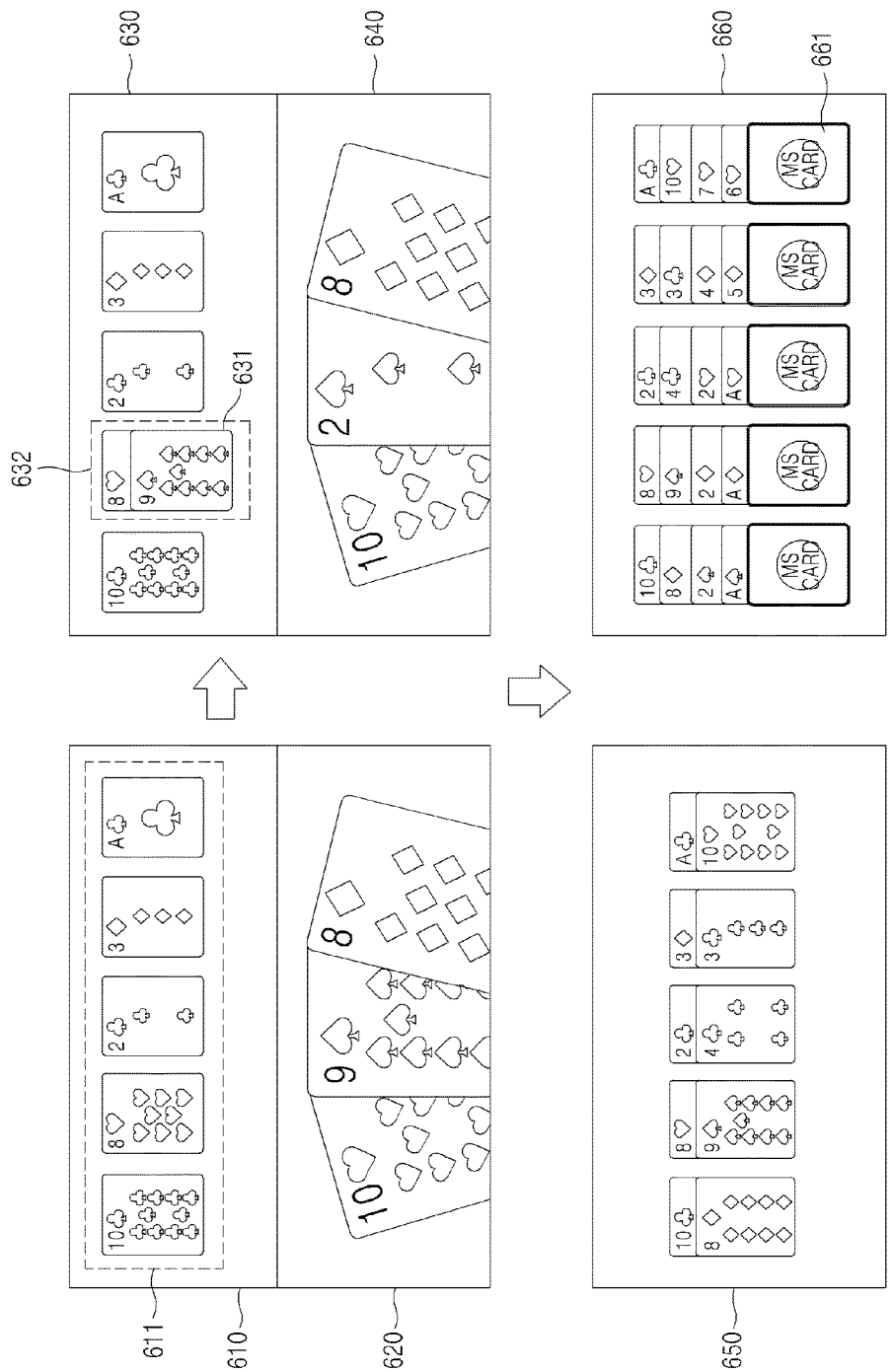

FIG. 7

| | Rating | Hand | Description |
|---|---|---|---|
| 6♣ 7♣ 8♣ 9♣ 10♣ | Rating 1 (Rank 1) | Straight flush | 5 cards of sequential number and all of the same suit |
| 5♣ 5♦ 5♠ 5♥ 10♣ | Rating 2 (Rank 2) | Four of a kind | 4 cards of the same number |
| A♥ A♠ A♦ 7♣ 7♦ | Rating 3 (Rank 3) | Full house | 3 cards of one number (triple) and two cards of another number (one pair) |
| 10♣ 8♣ 6♣ 2♣ A♣ | Rating 4 (Rank 4) | Flush | 5 cards of the same suit |
| 6♣ 7♣ 8♥ 9♥ 10♣ | Rating 5 (Rank 5) | Straight | 5 cards of sequential number, not all of the same suit |
| 2♣ 5♦ 5♥ 5♠ 7♣ | Rating 6 (Rank 6) | Triple | 3 cards of the same number and two cards of two other numbers |
| A♦ A♣ 9♥ 9♠ 5♣ | Rating 7 (Rank 7) | Two pair | 2 pairs of 2 cards of the same number (one pair) |
| A♦ A♣ 7♣ 5♥ 2♣ | Rating 8 (Rank 8) | One pair | two cards of the same number among 5 cards |
| A♥ 3♣ 4♣ 10♦ 7♣ | Rating 9 (Rank 9) | No pair | 5 cards corresponding to not all of the above case |

FIG. 10
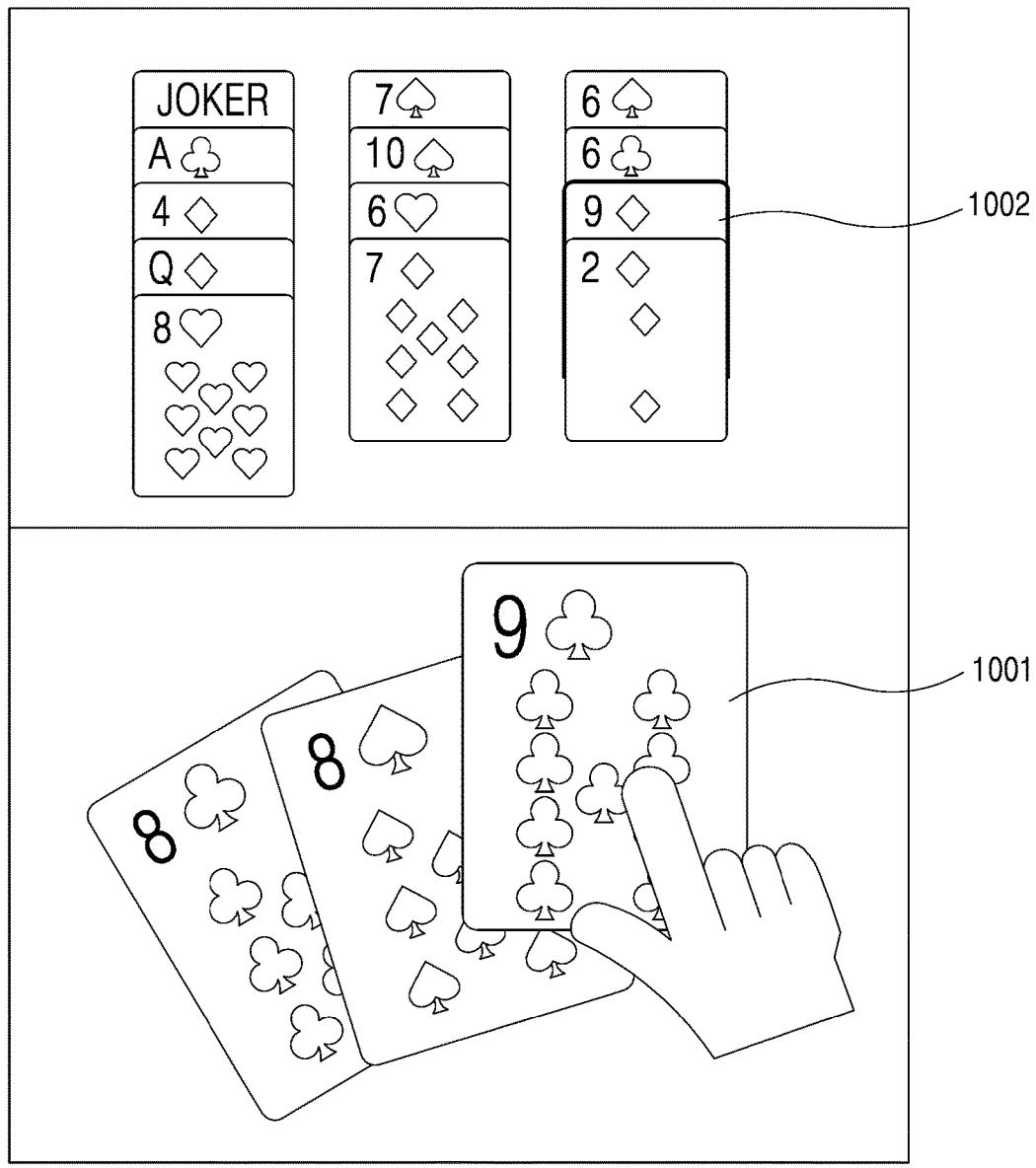
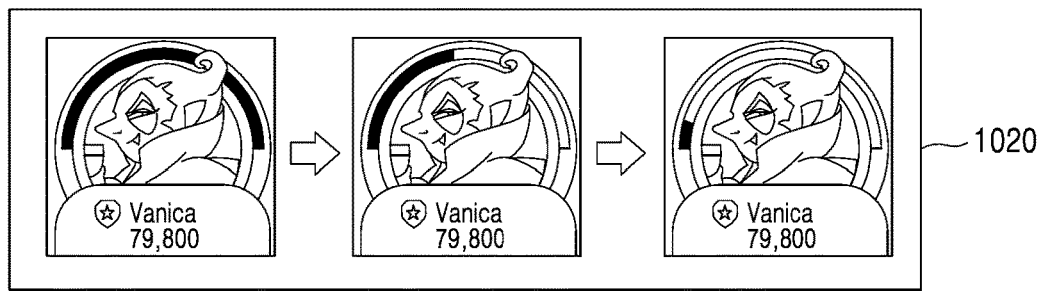

METHOD AND SYSTEM FOR PROVIDING AN ONLINE CARD GAME BETWEEN USER TERMINALS

CROSS REFERENCE TO RELATED APPLICATION

This application claims priority from and the benefit of Korean Patent Application No. 10-2016-0180768, filed on Dec. 28, 2016, which is hereby incorporated by reference for all purposes as if fully set forth herein.

BACKGROUND

Field

Exemplary embodiments of the invention relate generally to a game, and more specifically, to a method and system for providing a card game using cards that have several different patterns and numbers.

Discussion of the Background

With advancement of highly efficient portable devices, such as smart phones, more users enjoy playing mobile games. Because users generally play mobile games on the move or during short spare time, most of the mobile games running on mobile devices are puzzle game, tile game, card game, and the like.

A card game is a type of board games using various types of cards. Typical card games include poker, one card, Go-Stop, and the like. For example, a poker game allows game players to place a bet based on their own cards, and the player having the highest card combination wins the game. The playing cards may be trump cards each having a handheld size and made of thick paper or thin plastic. For example, the playing cards may be consisted of 52 cards divided into 4 types of suit, such as red suit of diamonds and hearts, and black suit of spades and clubs. Each of the 4 types of suit has a number or an alphabet indicating its denomination. For example, 13 denominations in one type of suit includes 2, 3, 4, 5, 6, 7, 8, 9, 10, J, Q, K, and A.

The above information disclosed in this Background section is only for understanding of the background of the inventive concepts, and, therefore, it may contain information that does not constitute prior art.

SUMMARY

Additional features of the inventive concepts will be set forth in the description which follows, and in part will be apparent from the description, or may be learned by practice of the inventive concepts.

An exemplary embodiment provides a method and system for providing a card game determining win or lose of a corresponding game by determining a card rating (e.g. poker hand) for each of a plurality of lines.

According to an exemplary embodiment, a method of providing a card game implemented by a computer includes the steps of: determining a plurality of open cards and a plurality of hidden cards different from one another to be assigned to a first user terminal and a second user terminal, each of the first and second user terminals including a screen configured to display an open card area having a plurality of rows and a plurality of columns and a hidden card area; providing a first card identifier information of the open cards, a first location information of the open cards, a second card identifier information of the hidden cards, and a second location information of the hidden cards; determining a rating of cards disposed along each column of the open card area based on a combination of the cards in the same column; comparing the rating of each column of the first user terminal to the rating of each corresponding column of the second user terminal; and determining win or lose of the card game based on the compared result for each column.

Any one of the hidden cards may be configured to be placed in one column of a second row only when all columns in a first row disposed above the second row are placed with cards.

Determining the hidden cards may include determining a new hidden card for the first user terminal that is different from the ones assigned to the first and second user terminals, after one of the assigned hidden cards is placed on the open card area; and determining a new hidden card for the second user terminal among the remaining unassigned cards.

Determining the rating of cards may include determining the rating for each column for each row for each of the first and second user terminals.

Determining the win or lose may include determining win or lose for each column in the open card area, and determining a user terminal having the greatest number of winning columns as a game winner.

The method may further include the step of calculating a game score based on the determined rating for each column in the open card area.

Calculating the game score may include summing up the game scores corresponding to the rating of the winning column, and calculating the summed up scores as the current game score of a corresponding user terminal.

The game score may increase at a greater amount as the rating is higher.

The rating may be based on the first identifier information and the second identifier information, and rating information may include the rating and the first and second line identification information are provided to a corresponding user terminal.

Comparing the rating may include comparing an expected rating of the first user terminal with an expected rating of the second user terminal whenever all columns of in the row are placed with the cards, and providing line property information indicating the higher expected rating to a corresponding user terminal.

According to an exemplary embodiment, a system for providing a card game implemented by a computer including at least one processor implemented to execute instructions readable in the computer, in which the at least one processor includes: a card determining unit configured to determine a plurality of open cards and a plurality of hidden cards different from one another to be assigned to a first user terminal and a second user terminal, each of the first and second user terminals including a screen configured to display an open card area having a plurality of rows and a plurality of columns and a hidden card areas; an information providing unit configured to provide a first card identifier information of the open cards, a first location information of the open cards, a second card identifier information of the hidden cards, and a second location information of the hidden cards to a corresponding user terminal; a rating determining unit configured to determine a rating of cards disposed along each column of the open card area based on a combination of the cards in the same column for each of the first and second user terminals; and a win or lose determining unit configured to compare the rating of the first user terminal and the rating of the second user terminal, and determine win or lose of the card game based on the compared result for each column.

Any one of the hidden cards may be configured to be placed in one column of a second row only when all columns in a first row disposed above the second row are placed with cards.

The card determining unit may be configured to determine a new hidden card different from the ones assigned to the first and second user terminals to be provided to the first user terminal, after one of the assigned hidden cards is placed on the open card area, and determine a new hidden card for the second user terminal among the remaining unassigned cards.

The rating determining unit may be configured to determine the rating for each column for each row for each of the first and second user terminals.

The win or lose determining unit may be configured to determine win or lose for each column in the open card area, and determine a user terminal having the greatest number of winning columns as a game winner.

The system may further include a score calculating unit configured to calculate a game score based on the determined rating for each column in the open card area.

The score calculating unit may be configured to sum up the game scores corresponding to the rating of the winning column, and calculate the summed up scores as the current game score of a corresponding user terminal.

The game score may increase at a greater amount as the rating is higher.

According to an exemplary embodiment, a computer program stored in a recording medium to execute a method for providing a card game combined with an electronic device implemented by a computer, in which the method for providing card game includes the steps of: determining a plurality of open cards and a plurality of hidden cards different from one another to be assigned to a first user terminal and a second user terminal, each of the first and second user terminals including a screen configured to display an open card area having a plurality of rows and a plurality of columns and a hidden card area; matching a first card identifier information of the open cards, a second card identifier information of the hidden cards, and a third identifier information of a corresponding user terminal, and saving the matched information; providing the first card identifier information, a first location information of the open cards, the second card identifier information of the hidden cards, and a second location information of the hidden cards to a corresponding user terminal; determining a rating of cards disposed along each column of the open card area based on a combination of the cards in the same column; comparing the rating of each column of the first user terminal to the rating of each corresponding column of the second user terminal; and determining win or lose of the card game based on the compared result for each column.

The method may further include calculating a game score based on the determined rating for each column in the open card area.

According to another exemplary embodiment, a system for providing card game implemented by a computer may include at least one processor implemented to execute instructions which is readable in the computer, and the at least one processor may include a card determining unit determining a plurality of open cards and a plurality of hidden cards to be assigned to each of user terminals playing card game for plurality of different cards, an information providing unit providing card identifier information indicating the determined plurality of open cards, location information of the open cards, card identifier information indicating the hidden cards, and location information of the hidden cards to a corresponding user terminal, a rating determining unit determining a rating corresponding to a result combining different cards exposed to each of a plurality of lines configuring open card area where the open cards are exposed on screen of the user terminal for each of user terminals, and a win or lose determining unit comparing a rating of a first user terminal and a rating of a second user terminal which are determined for each of lines and determining win or lose of card game based on the comparing result for each of lines.

According to another exemplary embodiment, a computer program stored in a recording medium to execute a method for providing card game combined with an electronic device implemented by a computer, wherein the method for providing card game may include determining a plurality of open cards and a plurality of hidden cards which are assigned to each of user terminals playing card game for a plurality of different cards, matching card identifier information of the determined plurality of open cards, card identifier information of the hidden cards, and identifier information of a corresponding user terminal and saving the matched information, providing card identifier information indicating the determined plurality of open cards, location information of the open cards, card identifier information indicating the hidden cards, and location information of the hidden cards to a corresponding user terminal, determining a rating corresponding to a result combining different cards exposed to each of a plurality of lines configuring open card area where the open cards are exposed on screen of user terminal for each of user terminals, comparing a rating of a first user terminal and a rating of a second user terminal which are determined for each line for each of lines, and determining win or lose of card game based on the comparing result for each of lines.

According to exemplary embodiments, game money may be reasonably provided to all of loser and winner by determining a rating (e.g. poker hand) for each of a plurality of lines and calculating score of a corresponding game based on score corresponding to a rating of winning line, not whole line. In other words, when a loser wins several times such as 3:2, 2:1, and the like, not is completely defeated such as 3:0, 5:0, and the like, game money is not unilaterally taken from the loser and provided to a winner, and game money may be reasonably provided to all of the loser and the winner by taking game money from the loser as much as the winner wins and providing the game money to the winner.

Also, according to exemplary embodiments, game score is differentially set according to the card rating (i.e., poker hand) corresponding to the winning line, and as the game score is calculated relatively high as the rating of winning line is higher than lower than when the rating is lower, the corresponding weighted game score may be provided to a user performing higher brain play to win with high rating than a user performing a play to simply win many.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 5 illustrates a screen configuration provided with the card game according to an exemplary embodiment.

FIG. 6 illustrates a screen configuration for describing the operation of determining a plurality of open cards and hidden cards according to an exemplary embodiment.

FIG. 7 is a chart illustrating card ratings according to an exemplary embodiment.

FIG. 10 is a drawing for describing the operation of generating effect for cards exposed to open card area according to an exemplary embodiment.

DETAILED DESCRIPTION

Figure 1:
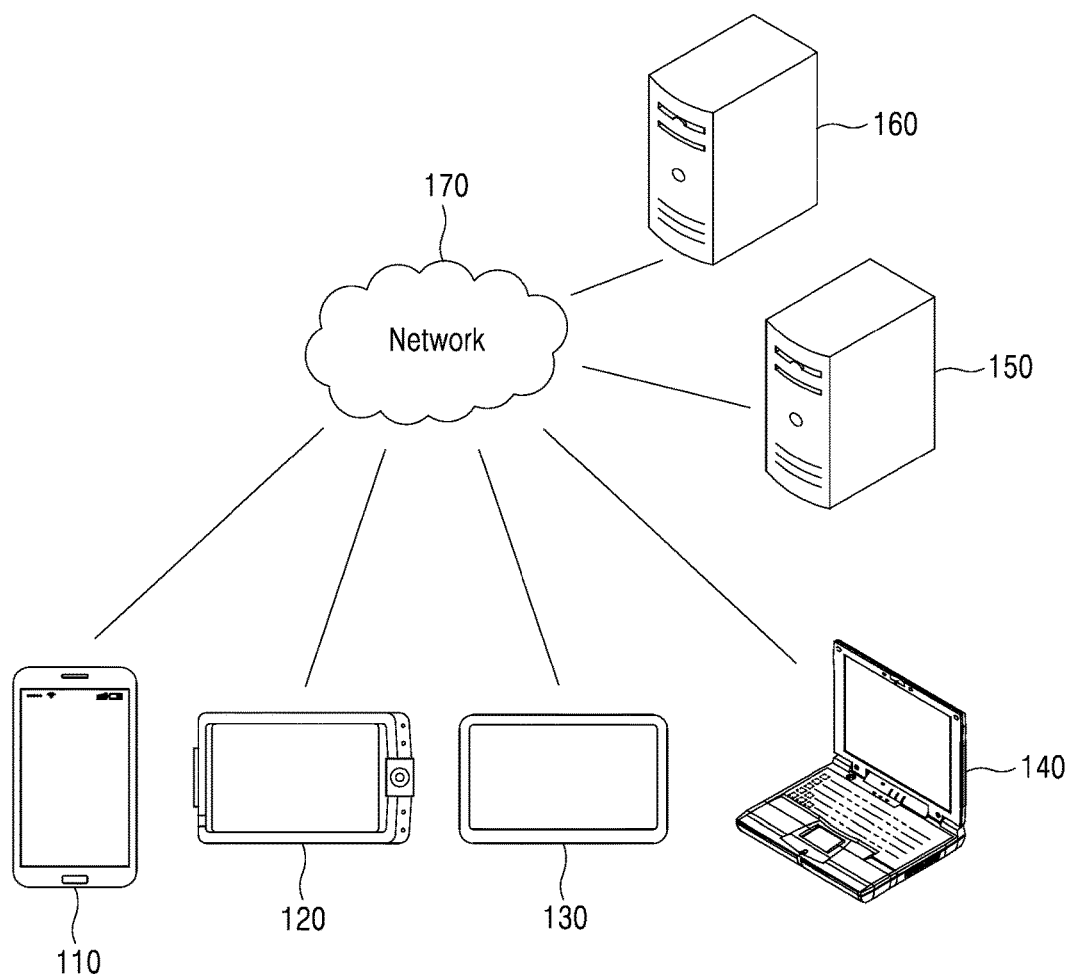
FIG. 1 illustrates an exemplary network environment according to an exemplary embodiment.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Exemplary embodiments of the invention relate to a method of providing a card game, and particularly, a method of providing a poker card game based on a predefined plurality of lines. For example, when a card (e.g. hidden card) selected by a user is exposed on a screen configured in rows and columns, a card rating (e.g., poker hand) based on a combination of cards exposed in each column is compared with that of the opponent game user to determine a winner of each column. The final winner is based on the number of games won for each column.

As used herein, 'open card' may refer to a card opened to all of electronic devices (e.g., user terminals) playing the card game, which may be displayed in an open card area (e.g. area corresponding to card table) of the screen.

In addition, 'hidden card' may refer to a card opened to only one electronic device, which may be displayed on a hidden card area of the screen. For example, when any one of hidden cards placed on the hidden card area is selected and placed in the open card area, the property of the corresponding hidden card may be changed to as open card to other users in the game.

FIG. 1 illustrates an exemplary network environment according to an exemplary embodiment. The network environment may include a plurality of electronic devices 110, 120, 130, and 140, a plurality of servers 150 and 160, and a network 170. However, the inventive concepts are not limited thereto, and the number of components in the network environment shown in FIG. 1 may be variously modified.

The electronic devices 110, 120, 130, and 140 may be fixed terminals of a computer or portable terminals. For example, the electronic devices 110, 120, 130, and 140 may be smart phones, mobile phones, navigations, desktops, laptops, digital broadcasting terminals, PDAs (Personal Digital Assistants), PMPs (Portable Multimedia Player), tablet PCs, and the like. The electronic device 110 may communicate with other electronic devices 120, 130, 140 and/or the servers 150 and 160 through the network 170 by using wireless or wired communication method.

The communication method is not limited, and may include a communication method utilizing communication network (e.g. mobile communication network, the wired Internet, the wireless Internet, and broadcasting network) or short-range wireless communication. For example, the network 170 may include any one or more of PAN (personal area network), LAN (local area network), CAN (campus area network), MAN (metropolitan area network), WAN (wide area network), BBN (broadband network), the Internet, and the like. Also, the network 170 may include any one or more of topologies including bus network, star network, ring network, mesh network, star-bus network, tree or hierarchical network, and the like.

Each of the servers 150 and 160 may be implemented with a computer device or a plurality of computer devices capable of providing an instruction, a code, a file, content, a service, and the like by communicating through the electronic devices 110, 120, 130, and 140 and the network 170.

Figure 2:
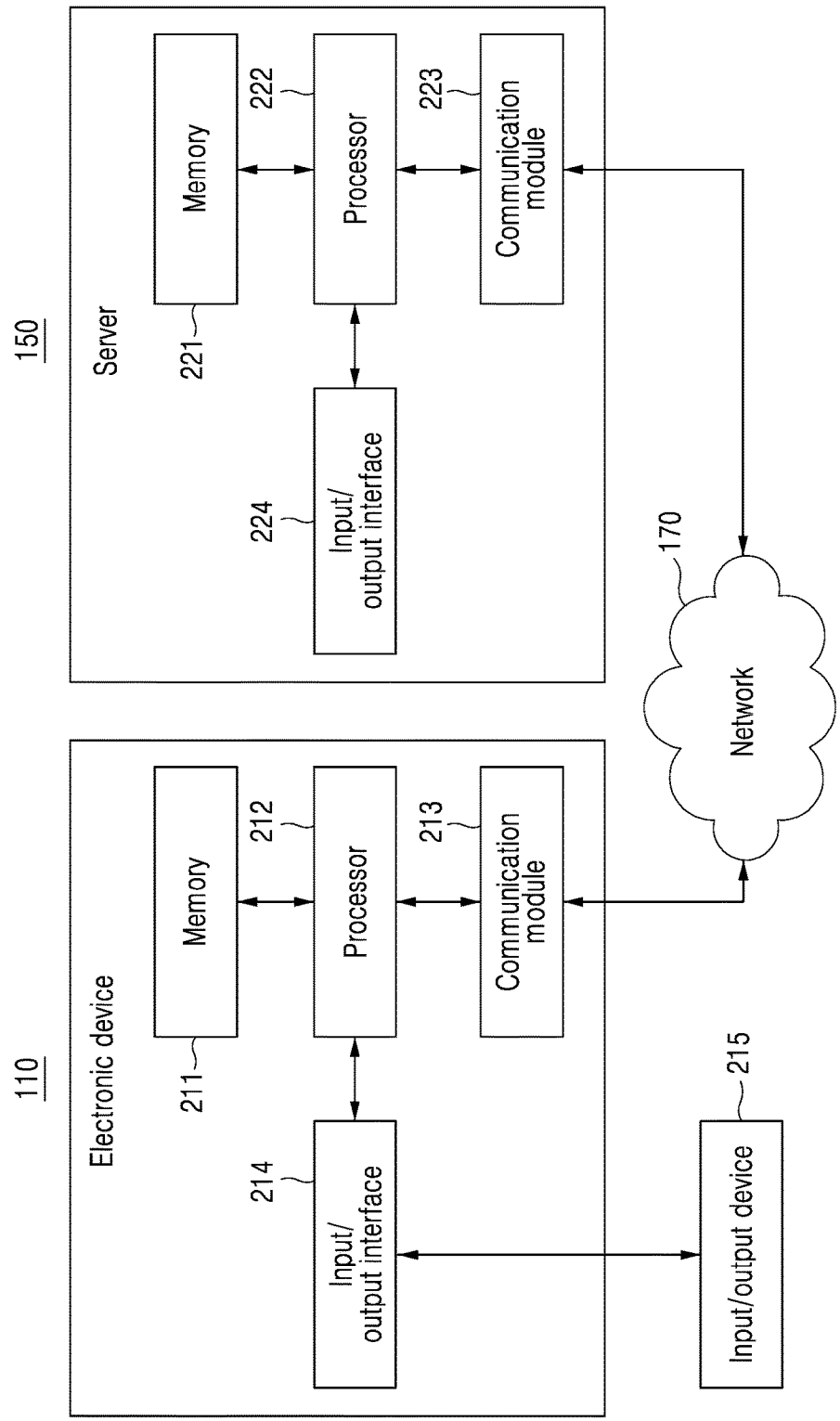
FIG. 2 is a block diagram illustrating internal configuration of an electronic device and a server according to an exemplary embodiment.

FIG. 2 is a block diagram illustrating internal configuration of an electronic device and a server according to an exemplary embodiment. FIG. 2 describes the internal configurations of the electronic device 110 and the server 150. Other electronic devices 120, 130, and 140 or the server 160 may have the same or substantially similar internal configuration.

The electronic device 110 and the server 150 may include memories 211 and 221, processors 212 and 222, communication modules 213 and 223, and input/output interfaces 214 and 224, respectively. The memories 211 and 221 may be computer readable recording medium, which may include a permanent mass storage device, such as RAM (random access memory), ROM (read only memory), and a disc drive. Also, the memories 211 and 221 may store OS (Operating System) or at least one program code (e.g. a code for the application installed and driven in the electronic device and the like). The software components may be loaded from other computer-readable recording medium separate from the memories 211 and 221. The other computer-readable recording medium may include a floppy disc, a disc, a tape, a DVD/CD-ROM drive, a memory card, and the like. In some exemplary embodiments, the software components may be loaded to the memories 211 and 221 through the communication modules 213 and 223, instead of the computer-readable recording medium. For example, at least one program may be loaded to the memories 211 and 221 based on a program, which may be installed by files distributed by the developers, or file distributing systems distributing application installation files (e.g. the server 160) via the network 170.

The processors 212 and 222 may be configured to process instructions of computer program by performing basic arithmetic, logic, and input/output operation. The instructions may be provided to the processors 212 and 222 by the memories 211 and 221, or the communication modules 213 and 223. For example, the processors 212 and 222 may be configured to execute the instructions received in accordance with the program code stored in the recording device, such as the memories 211 and 221.

The communication modules 213 and 223 may facilitate communication between the electronic device 110 and the server 150 through the network 170, or other electronic devices (e.g. the electronic device 120) or other server (e.g. the server 160). For example, a request generated from the processor 212 of the electronic device 110 according to a program code stored in the recording device, such as the memory 211, may be transmitted to the server 150 through the network 170 according to control of the communication module 213. In addition, a control signal or an instruction, content, a file, and the like generated according to control of the processor 222 of the server 150 may be received in the electronic device 110 through the communication module 213 of the electronic device 110 via the network 170. For example, the control signal or instruction of the server 150 may be received by the communication module 213 of the electronic device 110, then be transmitted to the processor 212 or the memory 211, and content or a file may be stored in the storage medium of the electronic device 110.

The input/output interface 214 may be an interface for an input/output device 215. For example, an input device may include a keyboard, a mouse, etc., and an output device may include a display for displaying a communication session of an application. As another example, the input/output interface 214 may be an interface for a device having an integrated input/output function, such as a touch screen. More particularly, when processing instructions of the computer program loaded to the memory 211, the processor 212 of the electronic device 110 may display a service screen or content by using data provided by the server 150 or the electronic device 120 on the display through the input/output interface 214.

Although not shown, the electronic device 110 and the server 150 may further include other components as needed. For example, the electronic device 110 may further include at least a part of the input/output device 215 or other components, such as a transceiver, a GPS (Global Positioning System) module, a camera, various sensors, a database, and the like. When the electronic device 110 is a smart phone, for example, various conventional components, such as acceleration sensor or gyro sensor, camera, various physical buttons, button using touch panel, input/output port, vibrator for vibrating, and the like may be included in the electronic device 110.

When database is included in the server 150, the database may match various information, for example, card identifier information, identifier information of an electronic device (e.g., identifier information of terminal), game money, game score information, location information where a corresponding card may be displayed on a screen of the electronic device, and the like with several electronic devices (e.g., user terminals) in the server 150, and may save and manage the matched information.

According to an exemplary embodiment, a system for providing a card game may be implemented to a device capable of executing an application. In other words, the system for providing a card game may be executed in any devices where an application is installed and executed. Hereinafter, the electronic device 110 will be described as being stored with a package file for installing and running the application.

Figure 3:
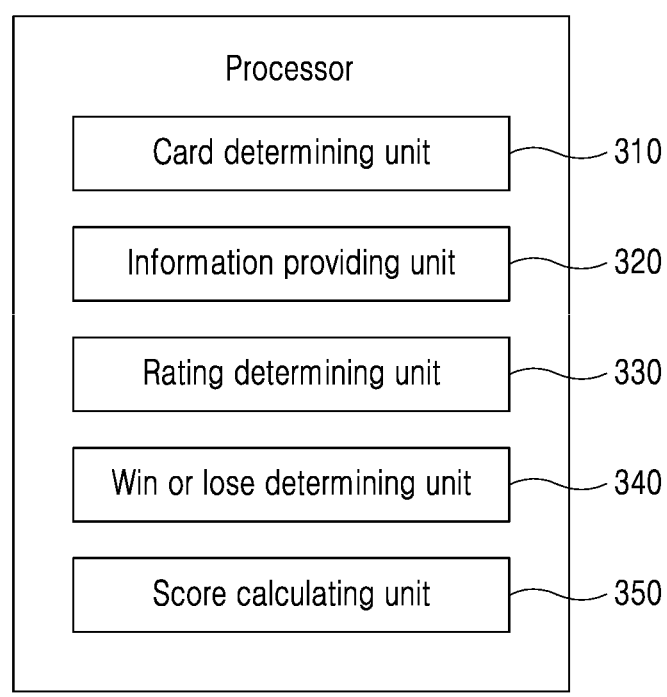
FIG. 3 is a block diagram illustrating a processor of a server according to an exemplary embodiment.
Figure 4:
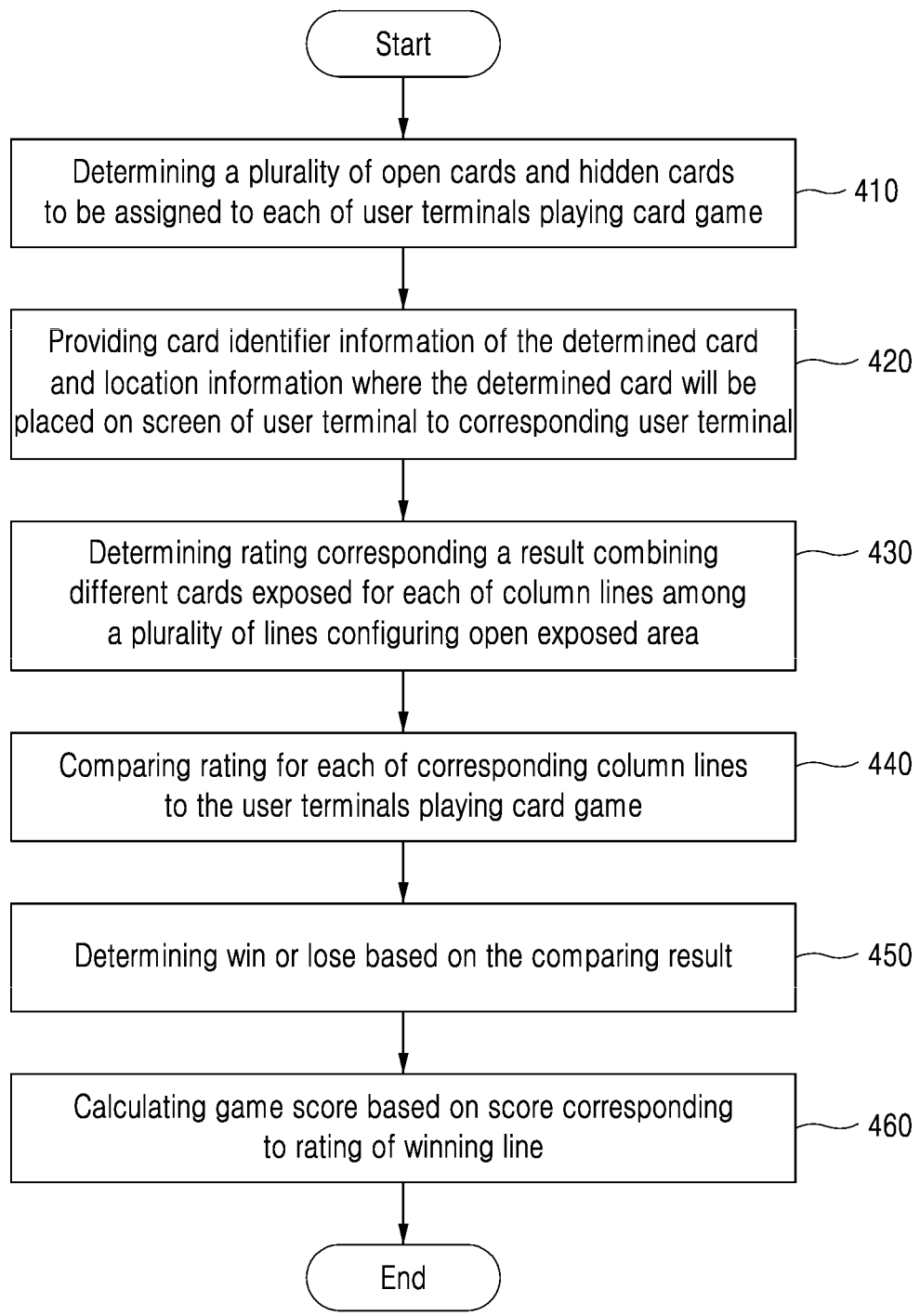
FIG. 4 is a flow chart illustrating a method for providing a card game according to an exemplary embodiment.

FIG. 3 is a block diagram illustrating a processor of a server according to an exemplary embodiment. FIG. 4 is a flow chart illustrating a method for providing a card game according to an exemplary embodiment.

The server 150 may implement the system for providing a card game, and as illustrated on FIG. 3, the processor 222 of the server 150 may include a card determining unit 310, an information providing unit 320, a rating determining unit 330, a win or lose determining unit 340, and a score calculating unit 350. Also, the processor 222 may identify each of the electronic devices 110 and 120 to provide the card game thereto, and may interwork with database that stores information associated with identifying cards to be assigned to a corresponding electronic device. The processor 222 may control the server 150 to perform operations 410 to 470 shown in FIG. 4. Here, the processor 222 may execute instructions according to OS (Operating System) code included in the memory 221 and at least one program code. Here, the components of the processor 222 may perform various functions according to the control instruction provided by the program code stored in the server 150. For example, the rating determining unit 310 may determine a card rating, which is based on a combination of open cards displayed in each column, by loading a program code stored in a file to the memory 221.

In order to provide a card game to the server 150 with electronic devices 110 and 120, the program code stored in the program file may be loaded to the memory 211 of the electronic device 110, which is a user terminal, such as a smart phone and the like.

When the program for the card game service is executed in the electronic device 110, the electronic device 110 may access to the web page associated with the card game provided by the server 150. Also, when the electronic device 110 and the electronic device 120 create a new room to play the card game, or the electronic device 110 joins the room created by the electronic device 120, the server 150 may provide the card game in accordance with operations 410 to 470 described below by interworking with the electronic device 110 and the electronic device 120. For example, the electronic device 110 and the electronic device 120 may execute the program and input login information (e.g. ID and password), and the processor 222 may perform authentication of each of the electronic devices 110 and 120 by referring to the database. When the authentication is successful, the server 150 may provide web page information corresponding to the lobby screen to the electronic device 110 and the electronic device 120. The electronic device 110 and the electronic device 120 may access the lobby screen, and may create a new room to play the card game or join the preexisting room. When the electronic device 110 and the electronic device 120 try to play a game in a card game room 1, the database may match identifier information (e.g. ID, nickname, mobile phone number, and the like) of a corresponding device and identifier information of the card game room, and may store or maintain the matched information. Then, the card determining unit 310 may determine cards to be provided to the electronic device 110 and the electronic device 120.

In FIG. 4, the server 150 will be described as providing a poker card game to the electronic device 110 and the electronic device 120.

In operation 410, the card determining unit 310 may determine open cards to be assigned to each of the electronic devices 110 and 120. Here, the card determining unit 310 may also determine hidden cards to be assigned to each of the electronic devices 110 and 120.

For example, when the poker card game is based on 52 cards that constitute one deck, and when the number of open cards and hidden cards are predetermined as 5 and 3, respectively, the card determining unit 310 may randomly determine 5 open cards for the electronic device 110 and 5 open cards for the electronic device 120 among the 52 cards. Also, the card determining unit 310 may randomly determine 3 hidden cards for the electronic device 110 and 3 hidden cards for the electronic device 120 among the remaining 42 cards. Then, the database may match card identifier information of each open card and card identifier information of each hidden card to the identifier information of the electronic device 110, and store and maintain the matched information. Likewise, the database may match card identifier information of each open card and card identifier information of each hidden card to the identifier information of the electronic device 120, and store and maintain the matched information. Although the number of open cards and the number of hidden cards have been described as being 5 and 3, however, these numbers may be varied. For example, when the screen has 3 column lines, the number of open cards may be 3 or other natural numbers different from 5 and 3, and the number of hidden cards also may be predefined with natural number other than 3 or lower than the number of open cards.

The screen providing the card game may display row and columns, and the card determining unit 310 may determine the location of open card area where the open cards are placed (or exposed) for each open card, and may determine location of hidden card area where the hidden cards are placed (or exposed) for each hidden card. Also, the determined location information of open card and the determined location information of hidden cards may be matched with card identifier information of a corresponding card and identifier information of the electronic device, and may store and maintain the matched information.

In operation 420, the information providing unit 320 may provide the identifier information of an open card, the identifier information of a hidden card, the location information of the open card, and the location information of the hidden card to a corresponding electronic device.

For example, the information providing unit 320 may provide the identifier information of an open card, the identifier information of a hidden card, the location information of the open card, and the location information of the hidden card to a corresponding electronic device through an application providing the card game. Then the corresponding electronic device may load the corresponding cards to the memory 211, based on the information received from the server 150. Also, the electronic devices 110 and 120 may display the loaded card images in a corresponding area (e.g., the open card area or the hidden card area) based on the location information of the corresponding card.

In operation 430, the rating determining unit 330 may determine a rating of cards in each column, which is based on a combination of cards in the same column of the open card area, which may be displayed on the screen of electronic device playing the card game.

For example, when the open card area is configured with 5 rows and 5 columns, the rating determining unit 330 may determine a card rating of each column by combining open cards exposed in each column. Here, the rating determining unit 330 may identify whether the open cards are placed on all columns in one row, and may determine a card rating for each of the columns when the open cards are placed on all of the rows. For example, the card rating may indicate a poker hand in a poker card game. Detailed description of determining the rating will be described in more detail below with reference to FIGS. 7 and 8.

In operation 440, the win or lose determining unit 340 may compare the rating of the electronic device 110 determined for each column and the rating of the electronic device 120 determined for each corresponding column.

For example, the win or lose determining unit 340 may compare a card rating determined by combining cards exposed to a column line 1 configuring the open card area for the electronic device 110, and a card rating determined by combing cards exposed to a column line 1 configuring the open card area for the electronic device 120. In this manner, the win or lose determining unit 340 may compare a card rating corresponding to a column line 2, a card rating corresponding to a column line 3, . . . , and a card rating corresponding to the last line for the electronic device 110 and the electronic device 120.

In operation 450, the win or lose determining unit 340 may determine win or lose for each column based on the compared result for each electronic device 110 and 120. Also, the win or lose determining unit 340 may determine the final win or lose for the present card game based on the number of wins or loses for each column. For example, the win or lose determining unit 340 may determine an electronic device having the greatest number of winning lines (or columns) as a final winner.

For example, when the rating of column line 1 of the electronic device 110 is four of a kind, which is ranked higher than the rating of the corresponding column line of the electronic device 120, which is flush, the win or lose determining unit 340 may determine that the electronic device 110 wins for the column line 1. As another example, when the rating of electronic device 120 is two pair, which is ranked higher than the rating of the electronic device 110 having one pair, the win or lose determining unit 340 may determine that the electronic device 120 wins for the column line 2. Here, when the open card area is configured with 5 column, the win or lose determining unit 340 may determine the winner for each of the remaining third, fourth, and fifth columns. Then, the information providing unit 320 may provide line identification information indicating each column and win or lose information of a corresponding line to a corresponding electronic device through the application.

When the electronic device 110 wins in 3 columns and the electronic device 120 wins in 2 columns, the win or lose determining unit 340 may finally determine the electronic device 110 as a winner, as the electronic device 110 has more winning columns. Then, the information providing unit 320 may provide the line identification information and the win or lose information of a corresponding line (or column) to a corresponding electronic device through the application with the final win or lose information. For example, the final win or lose information may be provided to the electronic device 110 and 120.

In operation 460, the score calculating unit 350 may calculate the game score of the winning electronic device based on the win or lose and the rating of each column configuring the open card area.

For example, when the electronic device 110 wins, the score calculating unit 350 may calculate the game score of the electronic device 110 based on the card rating of the column which the electronic device 110 has won. For example, when the electronic device 110 loses in the columns 2 and 4, and wins in the columns 1, 3, and 5, the score calculating unit 350 may sum up the game score based on the 3 winning lines (or columns), excluding the 2 loosing lines, to calculate the summed up score as a present game score of a corresponding electronic device. Here, the game score may be a predetermined value based on corresponding rating. For example, the highest rating may be set as 8 points and the lowest rating may be set as 0 point, and the game score may be set to be lowered from 8 to 0 points depending or the rating, or decreased by 1 point (or preset reference point). Accordingly, the game winner may obtain higher game score by winning with higher rating.

Also, the score calculating unit 350 may multiply a preset seed money by the present game score, and may calculate a final game money corresponding to the winning electronic device. The score calculating unit 350 may extract game money information matched to the identifier information of the electronic device 110 based on the identifier information of losing electronic device (e.g. the electronic device 110) in the database, and may update the game money information of the electronic device 110 after deducting the final game money from the extracted game money information. Furthermore, the score calculating unit 350 may the extract game money information matched to the identifier information of the electronic device 120 based on the identifier information of losing electronic device (e.g., the electronic device 120) in the database, and may update the game money information of the electronic device 120 after adding the calculated final game score to the extracted game money information.

FIG. 5 illustrates a screen configuration provided with the card game according to an exemplary of embodiment.

Referring to FIG. 5, when the electronic device 110 and the electronic device 120 execute a card game application and play the card game, screens 510 and 520 of the electronic devices 110 and 120 may display open card areas 511, 512, 521, and 522 and hidden card areas 513 and 523 for each electronic device. For example, the screen 510 of the electronic device 110 may include a first open card area 512 where the open cards of the electronic device 110 are exposed, a second open card area 511 where open cards of the opposing electronic device 120 are exposed, a first hidden card area 513 where the hidden cards of the electronic device 110 are exposed, and a second hidden card area 514 where the back of the hidden cards of the electronic device 120 are shown. Similarly, the screen 520 of the electronic device 120 may include a first open card area 522 where the open cards of the electronic device 120 are exposed, a second open card area 521 where open cards of the opposing electronic device 110 are exposed, a first hidden card area 523 where the hidden cards of the electronic device 2 120 are exposed, and a second hidden card area 524 where the back of the hidden cards of the electronic device 110 are shown.

Also, the open card areas 511, 512, 521, and 522 may be configured with a plurality of rows and a plurality of columns. For example, the open card areas 511, 512, 521, and 522 of FIG. 5 may be configured with 5 rows and 5 columns. Here, cards may be placed on the columns of each row, and the cards may be sequentially placed along each row. For example, after all of 5 open cards are placed in each column of the first row line, 5 open cards may be placed on each column of the second row line. When all of 5 cards are not placed on one row, the electronic device may be limited from placing a hidden card to the open card area (e.g. card table).

Also, the screens 510 and 520 of the electronic devices 110 and 120 may further include rating displaying areas 515 and 525, respectively. Here, the rating displaying areas 515 and 525 may be located at the bottom of its own open card areas 512 and 522 to display only its own rating without displaying a rating of the opponent device. Furthermore, in the rating displaying areas 515 and 525, rating information corresponding to a rating based on a combination of different cards exposed to each columns of a corresponding electronic device may be displayed.

FIG. 6 illustrates a screen configuration for describing the operation of determining a plurality of open cards and hidden cards according to an exemplary embodiment.

The server 150 may determine the open cards and hidden cards different from one another to be assigned to the electronic device 110. For example, the card determining unit 310 may determine club 10, heart 8, club 2, diamond 3, and club A as open cards. Here, the card determining unit 310 may determine the location (e.g. row line location and column line location), to which each of the open cards is placed on the open card area 610 of a corresponding electronic device. For example, location information of club 10 is (1,1), location information of heart 8 is (1,2), location information of club 3 is (1,3), location information of diamond 3 is (1,4), and location information of club A is (1,5). Also, the card determining unit 310 may match each of the determined location information of open cards with card identifier information of a corresponding open card and identifier information of the electronic device 110, and may store the matched information. Furthermore, the information providing unit 320 may provide location information of each open card, card identifier information, and card property information of each open card determined for the electronic device 110. Here, the information providing unit 320 may provide location information of each hidden card, card identifier information, and card property information of each hidden card determined for the electronic device 110. Here, the card property information may indicate whether a corresponding card is opened or hidden.

Then, the electronic device 110 may place and expose open cards corresponding to each of the 5 columns in the first row of the open card area 610, based on the card identifier information, card property information, and location information of a corresponding card received from the server 150. Likewise, a corresponding card may be placed and exposed to the hidden card area based on card identifier information, card property information, and location information of the corresponding card received from the server 150. For example, hidden card 1 (e.g. heart 10) having location information (1,1) may be placed on the left-most area of the hidden card area 620 and exposed, hidden card 2 (e.g. spade 9) having location information (1,2) may be placed on the center area of the hidden card area 620 and exposed, and hidden card 3 (e.g. diamond 8) having location information (1,3) may be placed on the right-most area and exposed.

When all of the cards are exposed to each of the 5 columns in the first row 611, any one of hidden cards selected by the electronic device 110 among the hidden cards may be placed on the open card area 610 and exposed.

For example, when a user of the electronic device 110 drags and drops any one card 631 (e.g., spade 9) among hidden cards on any one column line 632 among the 5 columns in the second row by using a finger, a touch pen, or a mouse, and the like, the electronic device 110 may transmit card identifier information of the hidden card selected through application, selection location information (e.g., dragged and dropped location information) of the selected open card area 630 to expose the selected hidden card, for example, (2,2), and location information on the hidden card area 640, which is vacant as the hidden card is dragged and dropped, for example, (1,2) to the server 150 through the application. Then, the card determining unit 310 may determine a new hidden card to be placed on the vacant space in the hidden card area 640 of the electronic device 110 from the remaining cards that have not been assigned to the electronic devices 110 and 120. For example, a spade 2 may be placed on the vacant space on the hidden card area 640, and the information providing unit 320 may transmit the location information (1,2), card identifier information indicating the determined spade 2 card, and card property information that the corresponding card is a hidden card. Then, the spade 2 card may be exposed to the space corresponding to (1,2) among the hidden card area 640 of the electronic device 110 based on the received information. Here, edge of the new received hidden card (e.g. the spade 2 card) may be highlighted with a predefined color and may be displayed on the screen.

Meanwhile, when the electronic device 110 receives the card identifier information of the selected hidden card, selection location information (e.g., dragged and dropped location information) on the open card area 630, for example, (2,2), and location information in the hidden card area 640, which is vacant as the hidden card is dragged and dropped, for example, (1,2), the rating determining unit 330 may match the card identifier information, selection location information, and location information on the hidden card area 640 and store and maintain the matched information to combine different cards placed on each column and determine card rating in corresponding line. For example, when a heart 10 card is selected among the hidden cards to be submitted to the open card area 630, the rating determining unit 330 may determine the card rating of the corresponding column line as one pair based on the club 10 having (1,1)

location information and the heart 10 having (1,2) location information. Here, the card rating determined for each of column lines, which is determined before the final card is placed on the column of the fifth row, may be temporary and be changed according to the combination of cards placed in the final row. For example, the first column may be changed according to cards placed on the third, fourth, and fifth rows, such as one pair, two pair, or triple, and the like.

As described above, a hidden card may be submitted to a column in a row, only after the cards are placed in all columns of the subsequent row. 5 open cards are automatically placed and exposed in each column in the first row, and the electronic device 110 and the electronic device 120 may alternately submit (drag and drop or touch) the selected hidden cards in the second row of the open card area, such that all cards may be placed in each column of the second row. For example, when 5 columns are configured, the electronic device 110 may select and submit any one of hidden cards 5 times in the second row line, before the electronic device 110 can submit a selected hidden card on any column in the third row line. To this end, the server 150 may identify whether cards are placed on all 5 columns of a corresponding row line, based on location information of an open card area received whenever the electronic devices 110 and 120 select and submit a hidden card. Also, when it is identified that cards have been placed on all of the lines, the rating determining unit 330 may determine a rating (e.g. poker hand) indicating a result based on a combination of the cards in the same column.

For example, as shown in an open exposed area 650 of the electronic device 110, when hidden cards selected by the electronic device 110 are submitted and opened in each column of the second row, the rating determining unit 330 may determine a rating for each column of the electronic device 110. In other words, whenever all cards are submitted in each column of a row, a card may be submitted to the next row, and the rating determining unit 330 may determine a card rating for each column of the corresponding electronic device whenever all cards are placed on each column of the row. Accordingly, when there are 5 rows, the rating determining unit 330 may provide the card rating for 4 times. In other words, when all cards are submitted to the second row, card rating is determined for each column for a first time, when all cards are submitted to the third row, card rating is determined for each column for a second time, and until all cards are submitted to the final row (the fifth row), operating determining card rating for each of column may be repeatedly performed.

Here, the hidden cards submitted to each column of the final row (for example, the fifth row) may be displayed with the back of the card, even though the hidden cards are submitted to the open card area 660. For example, when the hidden cards selected by the electronic device 110 are dragged and dropped to the open card area from the second row to the fourth row, front of the card indicating the number/alphabet and pattern of corresponding hidden card may be displayed. However, when the hidden card selected to be placed in a column of the fifth row is dragged and dropped, back (e.g. image indicating card kind, card tribe, or card avatar 661) of the corresponding hidden card may be displayed on the open card area.

FIG. 7 is a chart illustrating card ratings according to an exemplary of embodiment.

According to FIG. 7, the card rating may include a rating 1 corresponding to the highest rating to a rating 9 corresponding to the lowest rating. Here, the game score for each card rating may be set to increase by a greater amount as the card rating is higher.

For example, the game score of the rating 9, which is the lowest rating, may be set as 0 point, the game score of the rating 8 may be set as 1 point, the game score of the rating 7 may be set as 2 points, the game score of the rating 6 may be set as 3 points, the game score of the rating 5 may be 4 points, the game score of the rating 4 may be set as 5 points, the game score of the rating 3 may be set as 6 points, the game score of the rating 2 may be set as 7 points, and the game score of the rating 1 may be set as 8 points. As the game score is set to be relatively higher as the rating is increased, winning the game with higher rating may provide greater game scores and game money.

Although the rating may be the same, the win or lose determining unit 340 may determine win or lose of corresponding column based on card identifier information of the corresponding column. For example, the win or lose determining unit 340 may apply weight in the order of text (letter such as alphabet and number) A>K>Q>J>10>...>2 that the corresponding card indicates. For example, when a rating of the first column of the electronic device 110 is 5 four of a kind, and a rating of the first column of the electronic device 120 is K four of a kind, the electronic device 120 having the K four of a kind may be determined as a winner.

In FIG. 7, the rating 9 corresponding to no pair may be expressed as high card or top card, and the like.

Figure 8:
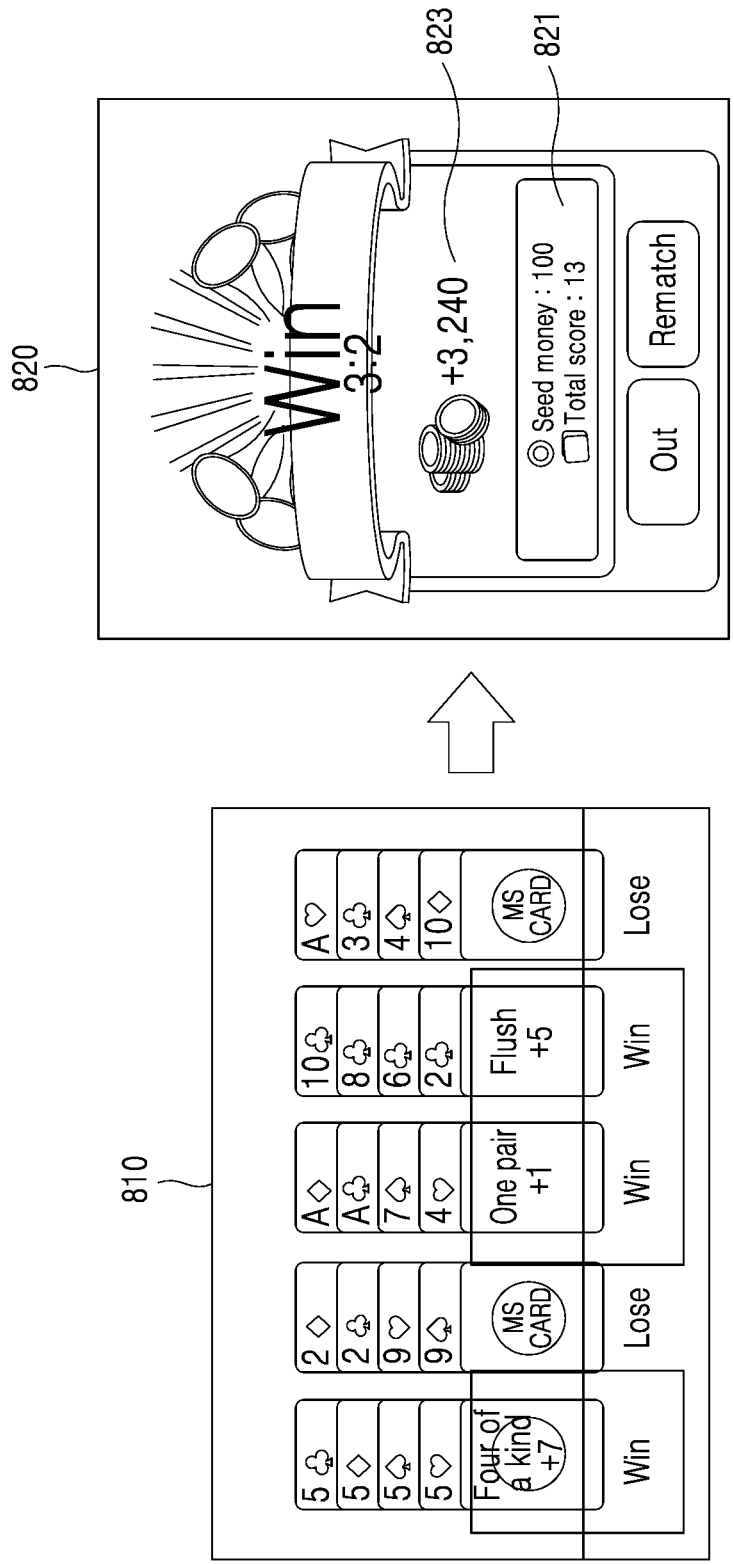
FIG. 8 is a screen configuration for describing the operation of determining win or lose by comparing rating for each column according to an exemplary embodiment.

FIG. 8 is a screen configuration for describing the operation of determining win or lose by comparing rating for each column according to an exemplary embodiment.

Referring to FIG. 8, when the electronic device 110 and the electronic device 120 playing the game drag and drop hidden cards to 5 columns of the second to the fifth rows (e.g., total of 20 hidden cards are dragged and dropped to an open card area 810 over 20 times), the rating determining unit 330 may determine a rating for each of the 5 columns. For example, as shown in FIG. 8, a rating of first column of the electronic device 110 is four of a kind, a rating of the second column is two pair, a rating of the third column is one pair, a rating of the fourth column is flush, and a rating of fifth column is no pair (or top). Similarly, the rating determining unit 330 may determine a rating for each of the 5 columns of electronic device 120. For example, it may be determined that a rating of the first column of the electronic device 120 is one pair, a rating of the second column is four of a kind, a rating of the third column no pair (or top), a rating of the fourth column is two pair, and a rating of the fifth column is straight.

Then, the win or lose determining unit 340 may compare the ratings for each column of the electronic device 110 and each corresponding column of the electronic device 120, and determine win or lose for each column. For example, the rating of the first columns of the first and second electronic devices 110 and 120 may be compared, and it may be determined that the electronic device 110 wins. In this manner, the win or lose determining unit 340 may compare the ratings for each corresponding column and determine that the electronic device 110 wins in the first, third, and fourth columns, and the electronic device 120 wins in the second and fifth columns. Then, the information providing unit 320 may provide win or lose information including win or lose of corresponding line with line identifier information identifying column to corresponding electronic device. Then, win or lose information indicating win or lose may be displayed on rating displaying area of the electronic device screen. Here, the win or lose information may be displayed with corresponding rating and game score on only the winning column and the win or lose information indicating lose may be displayed on the losing column.

The win or lose determining unit 340 may also compare the game score of corresponding rating, instead of rating, and determine win or lose for each of the columns. For example, when the rating of the column line 1 of the electronic device 110 is four of a kind and the rating of the column line 1 of the electronic device 120 is one pair, the score calculating unit 350 may calculate that the game score of the column line 1 of the electronic device 110 is 7 points and the game score of the column line 1 of the electronic device 120 is 1 point. Then, the win or lose determining unit 340 may determine that column line 1 of the electronic device 110 having the higher score wins and the column line 1 of the electronic device 120 loses by comparing 7 points and 1 point.

Likewise, the win or lose determining unit 340 may determine win or lose for each of lines by comparing rating or game score for each of the corresponding columns of the electronic devices 110 and 120, and may determine win or lose by comparing each of the selected lines.

For example, the win or lose determining unit 340 may compare the rating or the game score of the corresponding rating of any one column (e.g., column line 1) selected by the electronic device 110 and any one column (e.g., column line 5) selected by the electronic device 120. To this end, the win or lose determining unit 340 may receive line identifier information selected from the electronic device 110 and line identifier information selected from the electronic device 120, and may determine win or lose by comparing the rating or the game score corresponding to the line identifier of both of the electronic devices. For example, it may be determined that the column line 5 of the electronic device 120 wins. Here, if the column line 1 is selected and the corresponding line identifier information is provided to the server 150 through the application, such that the selected column line after the column line 1 of the electronic device 110 and the column line 2 of the electronic device 120 is not selected in duplicate with the previous selected column until final win or lose of the present game is determined, the column line 1 may be processed to inactive on the open card area 810. For example, previously selected column line 1 among the columns 1 to 5 on the open card area 810 may be processed and displayed in semitransparent or black colors.

Then, the win or lose determining unit 340 may determine win or lose by comparing any one column of the electronic device 110 and any one column line of the electronic device 120 among the 4 lines, except the previously selected column among the 5 columns. Likewise, when the electronic device selects a column line, the win or lose determining unit 340 may receive totally 5 times of line identifier information from each electronic device, and may determine win or lose by comparing the rating or the game score for 5 times. Also, the win or lose determining unit 340 may determine the electronic device having the greater number of winnings, determined by comparing for each of column, as a final game winner.

For example, when 3 columns of the electronic device 110 win more than 2 columns of the electronic device 120, the win or lose determining unit 340 may determine that the electronic device 110 having the greatest number of winning lines as a final game winner although the electronic device 120 has the highest rating (straight). Then, the information providing unit 320 may provide final game score 821 corresponding to the present game, game money 822 calculated based on the final game score and predefined seed money, and winning display identification information indicating winning to the electronic device 110. Then, corresponding fanfare image may be displayed on a screen 820 of the electronic device 110 based on the winning display identification information. Here, the fanfare image may include the final game score 821 and game money 823 provided through the application, and maybe displayed on the screen 820.

Here, the calculating unit 350 may calculate the game money by applying weight to the number of winning lines, besides the game score corresponding to the rating, for each of the winning columns in calculating the game money for each of the columns. For example, it may be calculated that the case of winning with 4:1 is provided relatively more money than the case of winning with 3:2.

Figure 9:
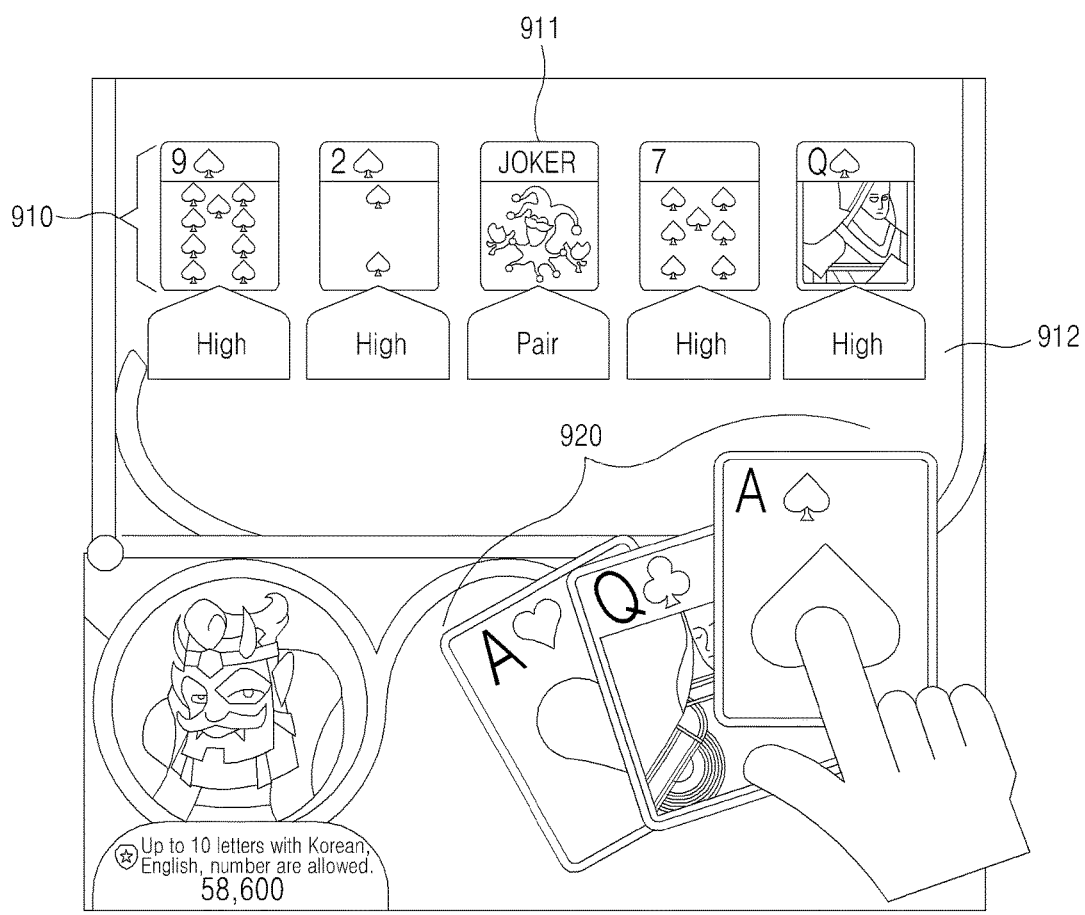
FIG. 9 is a drawing for describing the operation of providing expected rating according to an exemplary embodiment.

FIG. 9 is a drawing for describing the operation of providing expected rating according to an exemplary embodiment.

Referring to FIG. 9, the rating determining unit 330 may determine an expected rating for each column configuring the open card area of a corresponding electronic device before the present game is over (e.g., during the present game) to the electronic devices playing the card game.

For example, when 5 open cards are placed and exposed on each column in the first row configuring the open card area 910 on screen of the electronic device 110, the rating determining unit 330 may determine an achievable expected rating based on the placed open cards. For example, since any card below a joker card 911 (third column of the first row (1,3)) would result a combination of one pair, the rating determining unit 330 may determine that a expected rating of the third column in the first row line is one pair. Likewise, expected card rating for each of column in the first to fourth rows may be determined before cards are placed on each of the columns configuring the final row, and here, the rating determining unit 330 may determine expected rating whenever cards are placed on all of rows. In other words, when all of 5 cards are placed on the first row, expected rating for each column is determined, then, when all of 5 cards are placed on the second row, an achievable expected rating may be determined as an expected rating by combining the cards already placed on corresponding column of the first row, the cards placed on corresponding column of the second row, and 2 cards already placed. Also, the information providing unit 320 may provide expected rating information including the expected rating determined for each of column and line identifier information for identifying corresponding line to corresponding electronic device through the application.

In addition, the rating determining unit 330 may compare the expected rating determined for each column. After the comparison, line property information that identifies a column having the highest expected rating may be provided to the corresponding electronic device through the application. For example, the line property information with a visual effect different from other columns may be provided to the corresponding electronic device with the expected rating information and line identifier information. For example, when the corresponding column has the highest expecting rating, line property information of the corresponding column is set with 1 or on, and line property information of each of the other column lines may be set with 0 or off.

Referring back to FIG. 7, the edge of the selected hidden card on hidden card area 920 is displayed with highlights, and the edge of the remaining 2 hidden cards that are not selected may be displayed without highlight. Also, expected rating for each of the corresponding columns may be displayed in rating displaying area 912 of the corresponding column line based on the line identifier information, line property information, and expected rating information received from the application. Here, when a line has the line property information which is 1 or on, the expected rating which is displayed on the rating displaying area 912 may be displayed with predefined color in order to visually differentiate it from the expected rating of the other columns. For example, the expected rating of columns 1, 2, 4, and 5 may be displayed with gray color, and the column 3 having the highest expected rating may be displayed with yellow color on the rating displaying area 912.

FIG. 10 is a drawing for describing the operation of generating effect for cards exposed to open card area according to an exemplary embodiment.

In FIG. 10, although the open card area is shown as being configured with 5 rows and 3 columns, the inventive concepts are not limited thereto, and the numbers of rows and columns may be varied. For example, the open card area may be configured with 3 rows and 5 columns, or any rows and columns with natural numbers.

Referring to FIG. 10, when any one hidden card 1001 is selected among the 3 hidden cards placed on the hidden card area in a screen of the electronic device 110, a card having the same number with the selected hidden card 1001 may be highlighted on the edge of the selected open card 1002 with a predefined color and brightness, in order to be distinctively displayed from the other open cards in the open card area. Here, an effect may be occurred on only the corresponding card by highlighting the edge of the selected open card.

In FIG. 10, when it is time to select the hidden card of the electronic device 110, a time limit gauge bar 1020 may be shown in one specific area of the screen of the electronic device 110. Also, as time passes, the time limit gauge bar 1020 may be reduced over time in order to inform a game user of the electronic device 110 to quickly select the hidden card and submit the hidden card to the open card area. When the rest time corresponds falls within the predefined time (e.g., 2 seconds, 3 seconds, and the like), warning horn may be provided.

Figure 11:
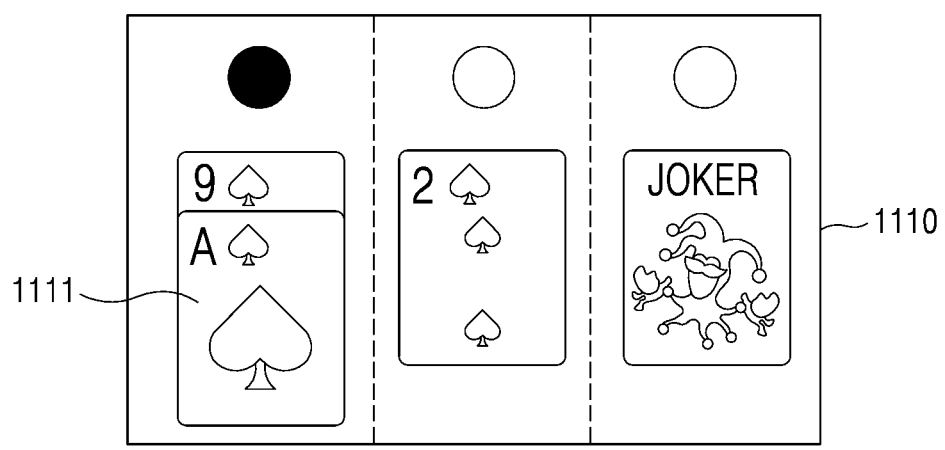
FIG. 11 is a drawing for describing the operation of displaying advantageous line by comparing the rating between electronic devices playing the card game according to an exemplary embodiment.

FIG. 11 is a drawing for describing the operation of displaying advantageous line by comparing the rating between electronic devices playing the card game according to an exemplary embodiment.

Referring to FIG. 11, the rating determining unit 330 may determine a relatively advantageous column in the corresponding electronic device than the opponent electronic device among the columns, by comparing rating for each of the columns with the opponent electronic device, whenever a selected hidden card is placed and exposed to the open card area.

For example, when a hidden card (e.g., spade A 1111) selected from the electronic device 110 may be dragged and dropped to the open card area 1110 and the corresponding card is opened to the opposing electronic device 120, the rating determining unit 330 may compare an expected rating, which may be based on the combination of cards placed on the column line 1 of the electronic device 110, and an expected rating, which may be based on the combination of cards placed on the column line 1 of the electronic device 120. As a comparison result, advantageous line may be determined.

For example, when it is determined that the expected rating of the column line 1 of the electronic device 110 is higher than the expected rating of the column line 1 of the electronic device 120, the information providing unit 320 may provide effect information indicating that the corresponding column is advantageous with line identification information indicating the column line 1 to the electronic device 1 110. Then, effect display information 1121 of the column line 1 may be displayed with a predefined color and brightness based on the effect information and the line identification information received through the application. For example, the effect display information 1121 may correspond to an image indicating lighting, and the corresponding lighting image may be on and displayed with the predefined color and brightness based on the effect information. Then, the user of the electronic device 1 110 may understand the advantageous situation that the column line 1 has higher rating than the opposing user of the electronic device 120. Also, as the lighting corresponding to the effect display information is off, the column line 2 and the column line 3 may understand that the opponent game user is relatively more advantageous.

Figure 12:
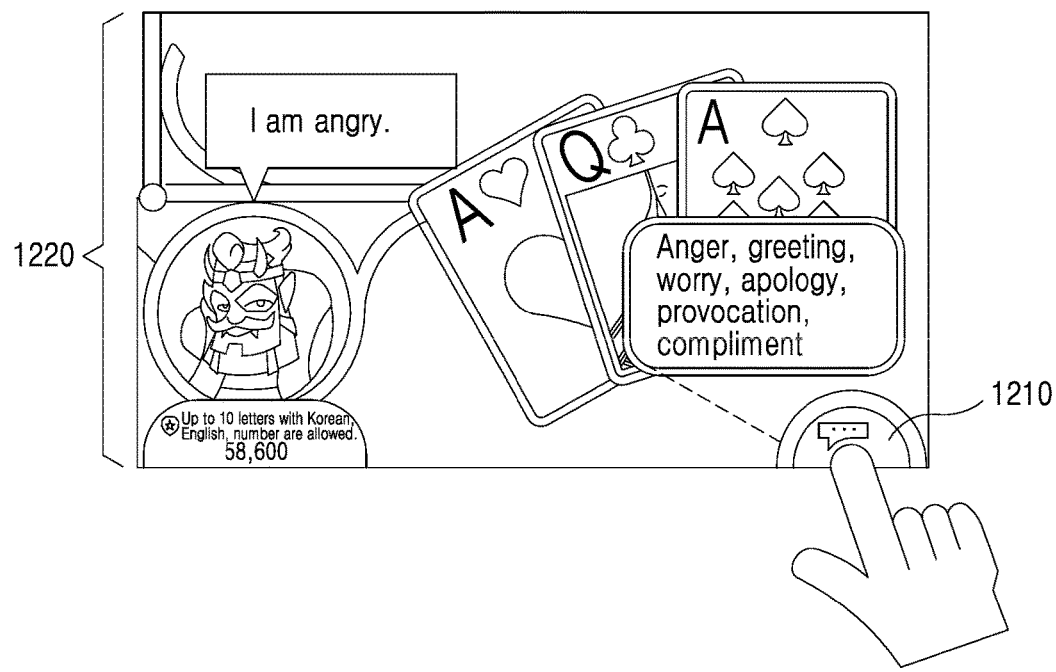
FIG. 12 is a drawing for describing the operation of providing chat between users playing the card game through avatar according to an exemplary embodiment.

FIG. 12 is a drawing for describing the operation of providing chat between users playing the card game through avatar according to an exemplary embodiment.

Referring to FIG. 12, when the lobby screen or chat menu 1210 is selected during the game, chat selection information indicating a predefined emotion express may be displayed on the screen of the electronic device 110. For example, the chat selection information, such as anger, greeting, worry, apology, provocation, compliment, and the like may be displayed. Here, when anger is selected, the selected chat selection information and identifier information of the electronic device 110 may be provided to the server 150 through the application. Here, the identifier information of the electronic device 110 and avatar identification information indicating an avatar of the electronic device 110 may be matched and stored and maintained the matched information in database of the server 150. Also, the server 150 may match identification information of the corresponding card game room, and identifier information of the electronic device 110 and electronic device 120 playing the game and store and maintain the matched information during the card game room is made and the game is progressed and maintained. Then, the server 150 may extract avatar identification information of the electronic device 110 from the database based on the identifier information of the electronic device 110, and may provide the extracted avatar identifier information and chat selection information to the electronic device 120. Then, the electronic device 120 may receive the avatar identifier information and chat selection information through the application, and may display chat content (e.g., "I am angry") corresponding to the chat selection information (e.g., anger) with the corresponding avatar (e.g., the avatar of the electronic device 1) on chat area 1220 on screen of the electronic device 120 based on the received information.

Likewise, the system for providing the card game may provide chat between the game users playing the card game through avatar set on card of the corresponding electronic device, and distribute poker cards each time the game is over, and bingo game may be provided in a form of mini game based on the distributed poker cards. Also, when bingo is achieved by collecting the distributed poker cards, reward may be provided to the electronic device that the bingo is achieved. Here, different rewards may be provided depending on row line bingo, column line bingo, diagonal line bingo, and as having more bingo lines, the number of rewards and relatively better rewards may be provided. For example, when 2 row lines are bingo, game money 100 reward may be provided, when a column line is bingo, game item reward may be provided, a row line and a column line is bingo, game money 300 reward may be provided, and a diagonal line is bingo, avatar reward may be provided.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present disclosure, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of implementing an online card game between a first user terminal and a second user terminal in communication with a computer, the method comprising the steps of:
    A) selecting, among a plurality of cards that are mutually exclusive, a first set of cards different from each other as a plurality of open cards and a second set of cards different from each other and excluding the first set as a plurality of hidden cards for the first user terminal, wherein the first terminal comprises a screen configured to display an open card area having a plurality of rows and a plurality of columns and a hidden card area;
    B) transmitting, from the computer to the first user terminal, a first card identifier information of the open cards, a first location information of the open cards, a second card identifier information of the hidden cards, and a second location information of the hidden cards, the first location information including a column number and a row number of a corresponding open card in the open card area;
    C) causing the screen to display an intermediate rating for each column of the open card area when one of the hidden cards in the hidden card area is moved to the open card area by user operation to change a location information of the one of the hidden cards, such that a card identifier information of the one of the hidden cards becomes one of the first card identifier information of the open cards, the intermediate rating being based on a first combination of the first card identifier information of the open cards arranged in a same column of the open card area;
    D) determining a rating of each column of the open card area when a number of rows for each column in the open card area reaches a first predetermined value, each rating being based on a second combination of the first card identifier information of the open cards in a same column of the open card area;
    E) performing the steps of A, B, C, and D for the second user terminal comprising a screen, wherein the first user terminal and the second user terminal are assigned with different cards;
    F) comparing the rating of each column of the first user terminal to the rating of each corresponding column of the second user terminal; and
    G) generating a report illustrating win or lose of the online card game between the first user terminal and the second user terminal based on a compared result for each column.

2. The method of claim 1, wherein any one of the hidden cards is configured to be placed in one column of a second row only when all columns in a first row disposed above the second row are placed with cards.

3. The method of claim 1, further comprising:
    H) selecting a new hidden card among the cards excluding the second set for the first and second user terminals, respectively, when the one of the hidden cards is moved to the open card area individually at both of the first and second user terminals.

4. The method of claim 1, wherein the report illustrating win or lose is based on a number columns having a higher rating than between the first and second user terminals.

5. The method of claim 1, further comprising:
    I) calculating a game score based on the rating of each column in the open card area for each of the first and second user terminals, respectively.

6. The method of claim 5, wherein calculating the game score comprises:
for the first user terminal:
summing up the game scores corresponding to the rating of each column having a higher rating than a corresponding column of the second user terminal; and
calculating the summed up scores as a current game score of the first user terminal; and
for the second user terminal:
summing up the game scores corresponding to the rating of each column having a higher rating than a corresponding column of the first user terminal; and
calculating the summed up scores as a current game score of the second user terminal.

7. The method of claim 5, wherein the game score increases at a greater amount as the rating is higher.

8. The method of claim 1, wherein:
the rating is further based on the second identifier information.

9. A system for implementing an online card game between a first user terminal and a second user terminal in communication with a computer comprising at least one processor implemented to execute instructions readable in the computer, wherein the at least one processor is configured to:
A) select, among a plurality of cards that are mutually exclusive, a first set of card different from each other as a plurality of open cards and a second set of cards different from each other and excluding the first set as a plurality of hidden cards for the first user terminal, the first user terminal comprising a screen configured to display an open card area having a plurality of rows and a plurality of columns and a hidden card areas;
B) transmit, from the computer to the first user terminal, a first card identifier information of the open cards, a first location information of the open cards, a second card identifier information of the hidden cards, and a second location information of the hidden cards, the first location information including a column number and a row number of a corresponding open card in the open card area;
C) cause the screen to display an intermediate rating for each column in the open card area when one of the hidden cards in the hidden card area is moved to the open card area by user operation to change a location information of the one of the hidden cards, such that a card identifier information of the one of the hidden cards becomes one of the first card identifier information of the open cards, the intermediate rating being based on a first combination of the first card identifier information of the open cards arranged in a same column of the open card area;
D) determine a rating of each column of the open card area when a number of row for each column in the open card area reaches a first predetermined value, each rating being based on a second combination of the first card identifier information of the open cards in a same column of the open card area;
E) perform the steps of A, B, C, and D for the second user terminal comprising a screen, wherein the first user terminal and the second user terminal are assigned with different cards; and
F) compare the rating of each column of the first user terminal to the rating of each corresponding column of the second user terminal; and
G) generate a report illustrating win or lose of the online card game between the first user terminal and the second user terminal based on a compared result for each column.

10. The system of claim 9, wherein any one of the hidden cards is configured to be placed in one column of a second row only when all columns in a first row disposed above the second row are placed with cards.

11. The system of claim 9, wherein the processor is further configured to:
H) selecting a new hidden card among the cards excluding the second set for the first and second user terminals, respectively, when one of the hidden cards is moved to the open card area individually at both of the first and second user terminals.

12. The system of claim 9, wherein the report illustrating win or lose is based on a number columns having a higher rating than an opposing user terminal.

13. The system of claim 9, wherein the processor is further configured to:
calculate a game score based on the rating of each column in the open card area for each of the first and second user terminals, respectively.

14. The system of claim 13, wherein calculating the game score comprises:
for the first user terminal:
summing up the game scores corresponding to the rating of each column having a greater rating than a corresponding column of the second user terminal; and
calculating the summed up scores as a current game score of the first user terminal; and
for the second user terminal:
summing up the game scores corresponding to the rating of each column having a greater rating than a corresponding column of the second user terminal; and
calculating the summed up scores as a current game score of the second user terminal.

15. The system of claim 13, wherein the game score increases at a greater amount as the rating is higher.

16. A computer program stored in a recording medium to execute a method for implementing an online card game between a first user terminal and a second user terminal in communication with via a computer, wherein the method for implementing the online card game comprises the steps of:
A) selecting, among a plurality of cards that are mutually exclusive, a first set of cards different from each other as a plurality of open cards and a second set of cards different from each other and excluding the first set as a plurality of hidden cards for the first user terminal, the first user terminal comprising a screen configured to display an open card area having a plurality of rows and a plurality of columns and a hidden card area;
B) transmitting, from the computer to the first user terminal, a first card identifier information of the open cards, a first location information of the open cards, a second card identifier information of the hidden cards, and a second location information of the hidden cards, the first location information including a column number and a row number of a corresponding open card in the open card area;
C) causing the screen to display an intermediate rating for each column in the open card area, when one of the hidden cards in the hidden card area is moved to the open card area by user operation to change a location information of the one of the hidden cards, card such that a card identifier information of the one of the hidden cards becomes one of the first card identifier information of the open cards, the intermediate rating being based on a first combination of the first card identifier information of the open cards arranged in a same column of the open card area;

D) determining a rating of each column of the open card area when a number of rows for each column in the open card area reaches a first predetermined value, each rating being based on a second combination of the first card identifier information of the open cards in a same column of the open card area;

E) performing the steps of A, B, C, and D for the second user terminal comprising second screen, wherein the first user terminal and the second user terminal are assigned with different cards;

F) comparing the rating of each column of the first user terminal to the rating of each corresponding column of the second user terminal; and G) generating a report illustrating win or lose of the online card game between the first user terminal and the second user terminal based on a compared result for each column.

17. The computer program of claim 16, further comprising:

I) calculating a game score based on the rating of each column in the open card area for each of the first and second user terminals, respectively.

* * * * *